United States Patent
Akiyama

(10) Patent No.: US 11,630,383 B2
(45) Date of Patent: Apr. 18, 2023

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/558,725

(22) Filed: Dec. 22, 2021

(65) Prior Publication Data

US 2022/0206374 A1 Jun. 30, 2022

(30) Foreign Application Priority Data

Dec. 24, 2020 (JP) .............................. JP2020-214712

(51) Int. Cl.
*G03B 21/20* (2006.01)
*G03B 33/12* (2006.01)
(Continued)

(52) U.S. Cl.
CPC ......... *G03B 21/204* (2013.01); *G02B 5/3083* (2013.01); *G02B 27/283* (2013.01);
(Continued)

(58) Field of Classification Search
CPC .............. G03B 21/204; G03B 21/2013; G03B 21/2066; G03B 21/2073; G03B 21/208; H04N 9/3161
(Continued)

(56) References Cited

U.S. PATENT DOCUMENTS

2012/0154767 A1* 6/2012 Kimura .............. G03B 21/2073
353/98
2015/0204517 A1 7/2015 Arakawa
(Continued)

FOREIGN PATENT DOCUMENTS

JP 2015-135455 7/2015
JP 2017-069221 4/2017
(Continued)

*Primary Examiner* — Jerry L Brooks
(74) *Attorney, Agent, or Firm* — Dority & Manning, P.A.

(57) ABSTRACT

A light source apparatus according to an aspect of the present disclosure includes a first light source section, a second light source section, a first polarization separator, a second polarization separator that reflects part of second light and transmits the other part of the second light, a first phase retarder which is disposed between the first polarization separator and the second polarization separator and on which the part of the second light reflected off the second polarization separator is incident, a wavelength conversion layer that converts the first light and the part of the second light into third light having a second wavelength band and outputs the third light toward the first polarization separator, and a first light focusing optical system disposed between the wavelength conversion layer and the first polarization separator. The wavelength conversion layer has a first surface via which the third light exits and a second surface that intersects with the first surface. The first light is focused by the first light focusing optical system and enters the wavelength conversion layer at least via the second surface thereof, and the second light enters the wavelength conversion layer via the first surface thereof.

9 Claims, 4 Drawing Sheets

(51) Int. Cl.
*G02B 27/28* (2006.01)
*G02B 5/30* (2006.01)
*H04N 9/31* (2006.01)

(52) U.S. Cl.
CPC ....... *G03B 21/208* (2013.01); *G03B 21/2013* (2013.01); *G03B 21/2066* (2013.01); *G03B 21/2073* (2013.01); *G03B 33/12* (2013.01); *H04N 9/3161* (2013.01); *H04N 9/3164* (2013.01)

(58) Field of Classification Search
USPC .......................................................... 353/20
See application file for complete search history.

(56) References Cited

U.S. PATENT DOCUMENTS

| | | |
|---|---|---|
| 2016/0077419 A1 | 3/2016 | Sheng |
| 2017/0329212 A1* | 11/2017 | Akiyama ............. G03B 21/208 |
| 2019/0064645 A1 | 2/2019 | Akiyama |
| 2021/0109430 A1 | 4/2021 | Akiyama |

FOREIGN PATENT DOCUMENTS

| | | |
|---|---|---|
| JP | 2017-204357 | 11/2017 |
| JP | 2018-087918 | 6/2018 |
| JP | 2018-135455 | 8/2018 |
| JP | 2019-045550 | 3/2019 |

* cited by examiner

LIGHT SOURCE APPARATUS AND PROJECTOR

The present application is based on, and claims priority from JP Application Serial Number 2020-214712, filed Dec. 24, 2020, the disclosure of which is hereby incorporated by reference herein in its entirety.

BACKGROUND

1. Technical Field

The present disclosure relates to a light source apparatus and a projector.

2. Related Art

In recent years, as a light source apparatus used in a projector, there is a light source apparatus using fluorescence generated by a phosphor as illumination light (see JP-A-2017-204357 and United States Patent Application Publication No. 2016/0077419, for example).

In general, it is known that an increase in the optical density of the excitation light incident on the phosphor lowers the fluorescence conversion efficiency of the phosphor. Reducing the optical density of the excitation light allows the phosphor to efficiently generate fluorescence. The light source apparatuses disclosed in JP-A-2018-087918 and JP-A-2015-135455, in which the excitation light is incident on the side surface of the phosphor, are configured to reduce the optical density of the excitation light.

In the light source apparatus described in JP-A-2018-087918, which uses a transmissive phosphor that emits fluorescence from one side thereof when the excitation light enters the phosphor via the other side thereof, it is difficult to cool the phosphor. There is therefore a problem of a decrease in the fluorescence conversion efficiency due to an increase in the temperature of the phosphor.

On the other hand, the light source apparatus described in JP-A-2015-135455 uses a reflective phosphor that emits fluorescence from one side thereof when the excitation light enters the phosphor via the one side thereof. Because of the nature of the structure of such a reflective phosphor, a common optical system serves as the optical system that causes the excitation light to enter the phosphor and the optical system that picks up the fluorescence emitted from the phosphor. Therefore, an optical system optimized for excitation light, in which the fluorescence emitted from the phosphor is not satisfactorily parallelized and cannot therefore efficiently enter the downstream optical system, has a problem of a decrease in the fluorescence utilization efficiency.

As described above, in the light source apparatuses of related art using reflective phosphors, it is difficult to improve the light utilization efficiency while reducing the optical density of the excitation light.

SUMMARY

To solve the problem described above, according to a first aspect of the present disclosure, there is provided a light source apparatus including a first light source section that outputs first light having a first wavelength band, a second light source section that outputs second light having the first wavelength band, a first polarization separator on which the first light outputted from the first light source section is incident and which reflects the first light, a second polarization separator on which the second light outputted from the second light source section is incident and which reflects part of the second light and transmits another part of the second light, a first phase retarder which is disposed between the first polarization separator and the second polarization separator and on which the part of the second light reflected off the second polarization separator is incident, a wavelength conversion layer that converts the first light and the part of the second light into third light having a second wavelength band different from the first wavelength band and outputs the third light toward the first polarization separator, a first light focusing optical system disposed between the wavelength conversion layer and the first polarization separator, and a concave lens which is disposed between the first light source section and the first polarization separator and on which the first light outputted from the first light source section is incident. The wavelength conversion layer has a first surface which faces the first polarization separator and via which the third light exits and a second surface that intersects with the first surface. The first light is focused by the first light focusing optical system and enters the wavelength conversion layer at least via the second surface thereof, and the part of the second light is focused by the first light focusing optical system and enters the wavelength conversion layer via the first surface thereof.

According to a second aspect of the present disclosure, there is provided a projector including the light source apparatus according to the first aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

Figure 1:
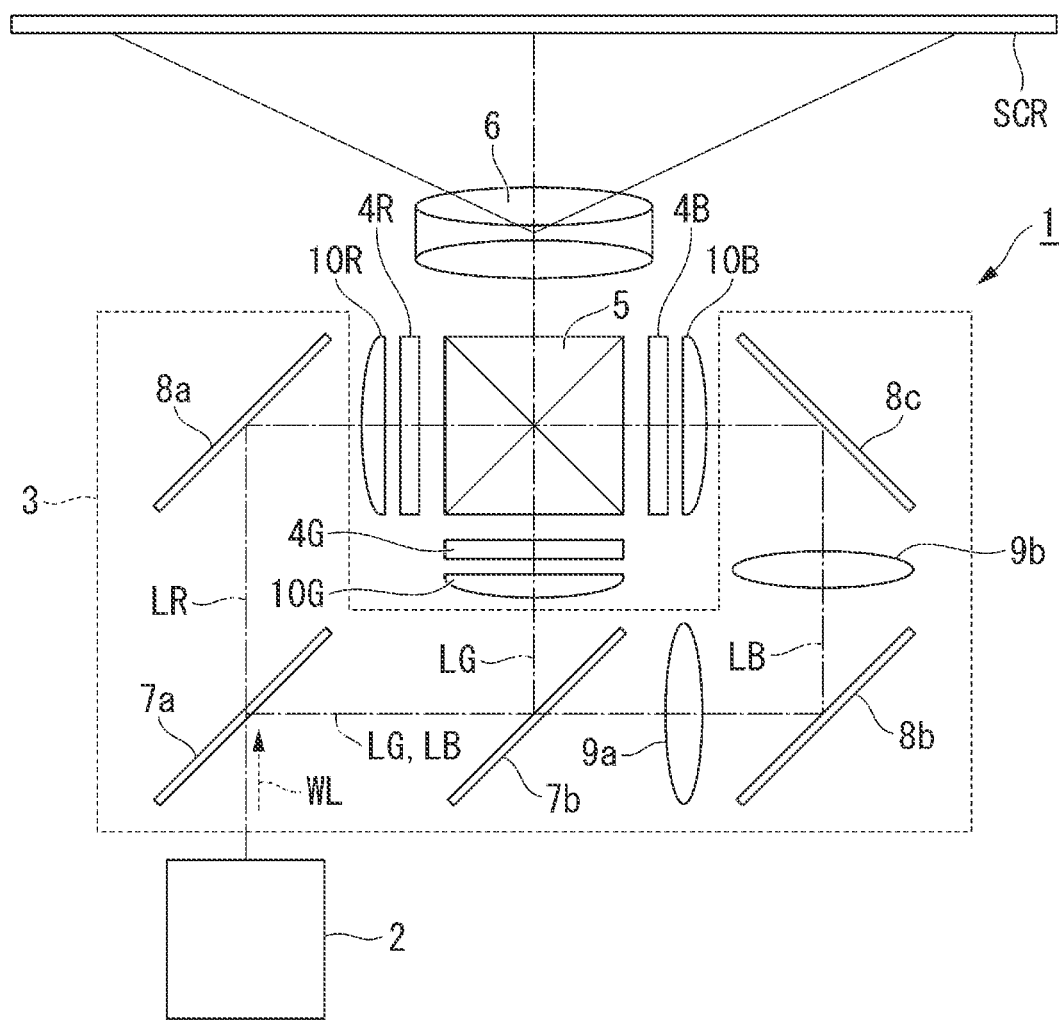
FIG. 1 shows a schematic configuration of a projector according to an embodiment.

An embodiment of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

An example of a projector according to the present embodiment will be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a light source apparatus 2, a color separation system 3, light modulators 4R, 4G, and 4B, a light combining system 5, and a projection optical apparatus 6.

The color separation system 3 separates white illumination light WL from the light source apparatus 2 into red light LR, green light LG, and blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

The first relay lens 9a and the second relay lens 9b are disposed on the downstream of the second dichroic mirror 7b in the optical path of the blue light LB.

The light modulator 4R modulates the red light LR in accordance with image information to form a red image light flux. The light modulator 4G modulates the green light LG in accordance with image information to form a green image light flux. The light modulator 4B modulates the blue light LB in accordance with image information to form a blue image light flux.

The light modulators 4R, 4G, and 4B are each, for example, a transmissive liquid crystal panel. Polarizers that are not shown in FIG. 1 are disposed on the light incident and exiting sides of each of the liquid crystal panels.

Field lens 10R, 10G, and 10B are disposed on the light incident side of the light modulators 4R, 4G, and 4B, respectively.

The image light fluxes from the light modulators 4R, 4G, and 4B enter the light combing system 5. The light combining system 5 combines the image light fluxes with one another and outputs the combined image light to the projection optical apparatus 6. The light combining system 5 is formed, for example, of a cross dichroic prism.

The projection optical apparatus 6 is formed of a projection lens group and enlarges the combined image light from the light combining system 5 and projects the enlarged image light toward the screen SCR. Enlarged color video images are thus displayed on the screen SCR.

Light Source Apparatus

Figure 2:
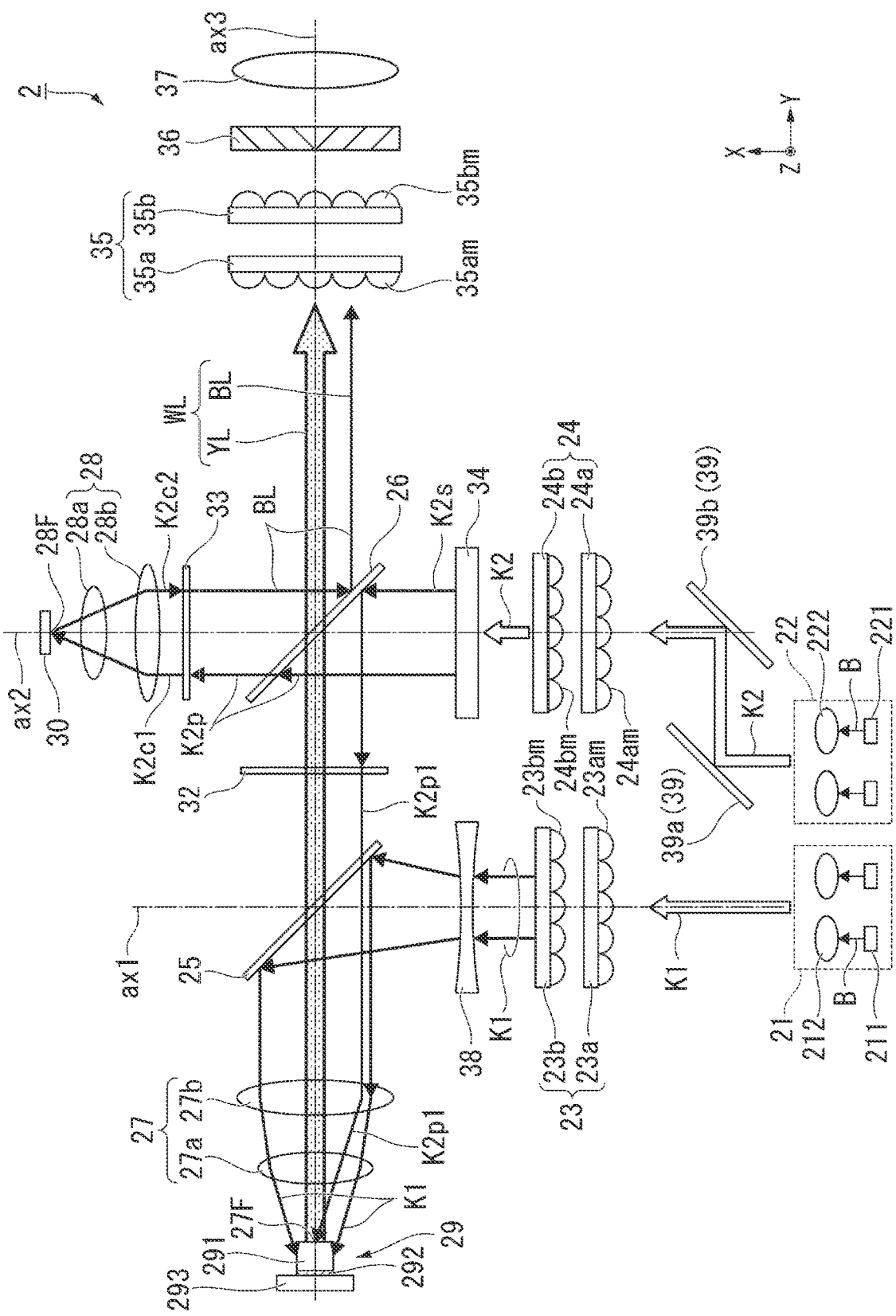
FIG. 2 shows a schematic configuration of a light source apparatus.

The configuration of the light source apparatus 2 described above will next be described. FIG. 2 shows a schematic configuration of the light source apparatus 2.

In the drawings described below, including FIG. 2, each configuration of the light source apparatus 2 will be described by using an XYZ coordinate system as required. The axis X is an axis parallel to optical axes ax1 and ax2 of the light source apparatus 2, the axis Y is an axis parallel to an illumination optical axis ax3 perpendicular to the optical axes ax1 and ax2, and the axis Z is an axis perpendicular to the axes X and Y. That is, the optical axes ax1 and ax2 and the illumination optical axis ax3 are set in the same plane, and the optical axes ax1 and ax2 are perpendicular to the illumination optical axis ax3.

The light source apparatus 2 includes a first light source section 21, a second light source section 22, a first homogenizer optical system 23, a second homogenizer optical system 24, a first polarization separator 25, a second polarization separator 26, a first light focusing optical system 27, a second light focusing optical system 28, a wavelength converter 29, a diffuser 30, a first phase retarder 32, a second phase retarder 33, a third phase retarder 34, an optical integration system 35, a polarization converter 36, a superimposing lens 37, a concave lens 38, and an optical path changer 39, as shown in FIG. 2.

The first light source section 21 includes a plurality of light emitters 211 and a plurality of collimation lenses 212. The plurality of light emitters 211 are each formed of a semiconductor laser. The plurality of light emitters 211 are arranged in an array in a single plane perpendicular to the optical axis ax1. The light emitters 211 each output blue light rays B formed of light beams having a peak wavelength of, for example, 445 nm. A semiconductor laser that outputs light rays B having a wavelength other than 445 nm (460 nm, for example) can instead be used as each of the light emitters 211.

The plurality of collimation lenses 212 are arranged, for example, in an array. The plurality of collimation lenses 212 are arranged in correspondence with the plurality of light emitters 211. The collimation lenses 212 each convert the light rays B outputted from the corresponding light emitter 211 into parallelized light.

The first light source section 21 thus outputs first light K1 as a parallelized light bundle having a blue wavelength band (first wavelength band) and containing the plurality of light rays B.

The second light source section 22 includes a plurality of light emitters 221 and a plurality of collimation lenses 222. The second light source section 22 has the same configuration as that of the first light source section 21. That is, the light emitters 221 each output the light rays B, and the collimation lenses 222 each convert the light rays B outputted from the corresponding light emitter 221 into parallelized light.

The second light source section 22 thus outputs second light K2 as a parallelized light bundle having the blue wavelength band (first wavelength band) and containing the plurality of light rays B.

In the present embodiment, the first light K1 and the second light K2 have the same light bundle width. The ratio between the amount of first light K1 and the amount of second light K2 is set at a ratio of, for example, 5:5. The first light source section 21 and the second light source section 22 may be formed of a single light source unit.

In the light source apparatus 2 according to the present embodiment, the first light source section 21, the first homogenizer optical system 23, the concave lens 38, and the first polarization separator 25 are arranged along the optical path of the chief ray of the first light K1 (along optical axis ax1).

The second light K2 outputted from the second light source section 22 enters the optical path changer 39. The optical path changer 39 is formed of a pair of mirrors 39a and 39b. The mirror 39a reflects the second light K2 toward the mirror 39b. The mirror 39b reflects the second light K2 from the mirror 39a along the optical axis ax2. When the second light K2 thus passes through the optical path changer 39, the optical path of the second light K2 is shifted toward the side +Y as compared with the optical path before the passage through the optical path changer 39, and the chief ray of the second light K2 after passing through the optical path changer 39 travels along the optical axis ax2.

In the light source apparatus 2 according to the present embodiment, the mirror 39b of the optical path changer 39, the second homogenizer optical system 24, the third phase retarder 34, the second polarization separator 26, the second phase retarder 33, the second light focusing optical system 28, and the diffuser 30 are arranged along the optical path of the chief ray of the second light K2 having passed through the optical path changer 39 (along optical axis ax2).

The second light K2 having passed through the optical path changer 39 enters the second homogenizer optical system 24. The second homogenizer optical system 24 is formed, for example, of a lens array 24*a* and a lens array 24*b*. The lens array 24*a* includes a plurality of lenslets 24*am*, and the lens array 24*b* includes a plurality of lenslets 24*bm*.

The lens array 24*a* separates the second light K2 into a plurality of thin light ray bundles. The lenslets 24*am* of the lens array 24*a* each bring the thin light ray bundle into focus at the corresponding lenslet 24*bm* of the lens array 24*b*. The lens array 24*b*, along with the first light focusing optical system 27 which will be described later, forms images of the lenslets 24*am* of the lens array 24*a* on the wavelength converter 29. The lens array 24*b*, along with the second light focusing optical system 28 which will be described later, further forms images of the lenslets 24*am* of the lens array 24*a* on the diffuser 30.

The second light K2 having passed through the second homogenizer optical system 24 enters the third phase retarder 34.

The third phase retarder 34 is a half-wave plate configured to be rotatable. The second light K2, which is laser light, is linearly polarized. The light having passed through the third phase retarder 34 is therefore light containing an S polarization component and a P polarization component mixed at a predetermined ratio. That is, appropriately setting the angle of rotation of the third phase retarder 34 allows the ratio between the S polarization component and the P polarization component to be set at a predetermined value. The angle of rotation of the third phase retarder 34 is set as appropriate in accordance with the white balance of the illumination light to be generated.

The second light K2 passes through the third phase retarder 34 and is converted by the third phase retarder 34 into light containing the S polarization component and the P polarization component. In the present embodiment, the S polarization component of the second light K2 having passed through the third phase retarder 34 is referred to as a light ray bundle K2*s* (part of second light), and the P polarization component of the second light K2 having passed through the third phase retarder 34 is referred to as a light ray bundle K2*p* (other part of second light).

The second light K2 having passed through the third phase retarder 34 is incident on the second polarization separator 26. The second polarization separator 26 has a polarization separation function of reflecting the S polarization component of the light incident thereon and transmitting the P polarization component of the incident light. The second polarization separator 26 transmits fluorescence YL, which will be described later and has a wavelength band different from that of the second light K2, irrespective of the polarization state of the fluorescence YL. The second polarization separator 26 is disposed so as to incline by 45° with respect to the optical axis ax2 and the illumination optical axis ax3.

The light ray bundle K2*p* of the second light K2 passes through the second polarization separator 26. The light ray bundle (light formed of first polarization component) K2*p* formed of the P polarization component and having passed through the second polarization separator 26 enters the second phase retarder 33. The second phase retarder 33 is formed of a quarter-wave plate (λ/4 plate). The light ray bundle K2*p* formed of the P polarization component is converted into a light ray bundle K2*c*l formed, for example, of right-handed circularly polarized light when passing through the second phase retarder 33. The circularly polarized light ray bundle K2*c*l having exited out of the second phase retarder 33 enters the second light focusing optical system 28. The light ray bundle K2*s* formed of the S polarization component and reflected off the second polarization separator 26 will be described later.

The second light focusing optical system 28 is disposed between the second polarization separator 26 and the diffuser 30. The second light focusing optical system 28 is formed, for example, of pickup lenses 28*a* and 28*b*. The second light focusing optical system 28 has the function of focusing the light ray bundle K2*c*1 at the diffuser 30 and picking up and parallelizing the diffusively reflected light outputted from the diffuser 30.

The second light focusing optical system 28 cooperates with the second homogenizer optical system 24 to homogenize the illumination distribution on the diffuser 30. In the present embodiment, the diffuser 30 is disposed at a focal point 28F of the second light focusing optical system 28. That is, the front surface of the diffuser 30 is located in the plane containing the focal point 28F of the second light focusing optical system 28.

The diffuser 30 is formed, for example, of a light reflective member and has irregularities at the front surface thereof. The diffuser 30 is formed by deposition of an Ag film at the front surface of a base having irregularities formed, for example, by blasting. The diffuser 30 may be configured to be rotatable around a predetermined center axis of rotation.

The diffuser 30 diffuses and reflects the circularly polarized light ray bundle K2*c*1 having exited out of the second light focusing optical system 28 toward the second polarization separator 26. For example, the light ray bundle K2*l*1, which is right-handed circularly polarized light, is diffused by and reflected off the diffuser 30 to form a light ray bundle K2*c*2, which is left-handed circularly polarized light. The light ray bundle K2*c*2 is parallelized by the second light focusing optical system 28 and passes through the second phase retarder 33 so as to be converted into diffused blue light BL formed of the S polarization component (light formed of second polarization component). The diffused blue light BL formed of the S polarization component is reflected off the second polarization separator 26 toward the optical integration system 35.

On the other hand, the light ray bundle K2*s* formed of the S polarization component and reflected off the second polarization separator 26 enters the first phase retarder 32. The first phase retarder 32 is a half-wave plate. The first phase retarder 32 converts the light ray bundle K2*s* formed of the S polarization component into a light ray bundle K2*p*1 formed of the P polarization component. The light ray bundle K2*p*1 is incident on the first polarization separator 25.

The first light K1 outputted from the first light source section 21 will be subsequently described.

The first light K1 outputted from the first light source section 21 enters the first homogenizer optical system 23. The first homogenizer optical system 23 is formed, for example, of a lens array 23*a* and a lens array 23*b*. The lens array 23*a* includes a plurality of lenslets 23*am*, and the lens array 23*b* includes a plurality of lenslets 23*bm*.

The lens array 23*a* separates the first light K1 into a plurality of thin light ray bundles. The lenslets 23*am* of the lens array 23*a* each bring the thin light ray bundle into focus at the corresponding lenslet 23bm of the lens array 23b. The lens array 23b, along with the first light focusing optical system 27 which will be described later, forms images of the lenslets 23am of the lens array 23a on the wavelength converter 29.

In the light source apparatus 2 according to the present embodiment, the concave lens 38 is provided between the first polarization separator 25 and the first light source section 21, more specifically, between the first polarization separator 25 and the first homogenizer optical system 23. After passing through the first homogenizer optical system 23, the first light K1 enters the concave lens 38, which causes the first light K1 to diverge, and the divergent first light K1 is incident on the first polarization separator 25. The concave lens 38 has concave surfaces, as the lens surface, on the surface facing the first polarization separator 25, the surface facing the first homogenizer optical system 23 or the surface facing the lens array 23b.

In the present embodiment, the first light source section 21 outputs, as the first light K1, light formed of the S polarization component with respect to the first polarization separator 25. The first polarization separator 25 has a polarization separation function of reflecting the S polarization component of the light incident thereon and transmitting the P polarization component of the incident light. The first polarization separator 25 transmits the fluorescence YL, which will be described later and has a wavelength band different from that of the first light K1, irrespective of the polarization state of the fluorescence YL. The first polarization separator 25 is disposed so as to incline by 45° with respect to the optical axis ax1 and the illumination optical axis ax3.

The first light K1 is reflected off the first polarization separator 25 and enters the first light focusing optical system 27. The light ray bundle K2p1 having traveling via the first phase retarder 32, which is formed of P polarization component with respect to the first polarization separator 25, passes through the first polarization separator 25 and enters the first light focusing optical system 27. The first light focusing optical system 27 is disposed between the wavelength converter 29 and the first polarization separator 25.

The first light focusing optical system 27 is formed, for example, of pickup lenses 27a and 27b. The first light focusing optical system 27 has the function of focusing the first light K1 and the light ray bundle K2p1, which is part of the second light K2, at a phosphor layer 291 of the wavelength converter 29, and the function of picking up and parallelizing the fluorescence YL emitted from the phosphor layer 291.

The wavelength converter 29 includes the phosphor layer (wavelength conversion layer) 291, a substrate 293, and a reflection member 292. The wavelength converter 29 is a reflective wavelength converter that outputs the fluorescence YL toward the side on which the first light K1 and the light ray bundle K2p1 is incident. A rotary wavelength converter including the substrate 293 rotating around a predetermined axis may be used as the wavelength converter 29.

The phosphor layer 291 is a rod-shaped phosphor having a front surface (first surface) 2911, side surfaces (second surface) 2912, and a rear surface (third surface) 2913. The phosphor layer 291 contains phosphor particles that absorb the first light K1 and light ray bundle K2p1 as excitation light, convert the absorbed light into the fluorescence (third light) YL having a yellow wavelength band (second wavelength band), and output the fluorescence YL. The phosphor particles can, for example, be yttrium-aluminum-garnet-based (YAG-based) phosphor particles. The phosphor particles may be made of one type of material, or a mixture of particles made of two or more materials may be used as the phosphor particles. The phosphor layer 291 may, for example, be a phosphor layer in which the phosphor particles are dispersed in an inorganic binder, such as alumina, or a phosphor layer containing sintered phosphor particles with no binder.

The front surface 2911 of the phosphor layer 291 is the surface facing the first polarization separator 25 and is the surface on which the excitation light is incident and via which the generated fluorescence YL exits. The side surfaces 2912 are surfaces that intersect with the front surface 2911. The rear surface 2913 is the surface opposite from the front surface 2911. The reflection member 292 is provided at the rear surface 2913 of the phosphor layer 291. The reflection member 292 is formed, for example, of a metal mirror or a dielectric mirror.

The phosphor layer 291 is disposed so as to face the first light focusing optical system 27. In the present embodiment, the front surface 2911 of the phosphor layer 291 is located at a focal point 27F of the first light focusing optical system 27. That is, the front surface 2911 of the phosphor layer 291 is located in a plane containing the focal point 27F of the first light focusing optical system 27. The fluorescence YL having exited via the front surface 2911 of the phosphor layer 291 is therefore satisfactorily parallelized by the first light focusing optical system 27.

The substrate 293 is thermally coupled to the phosphor layer 291 via the reflection member 292. The substrate 293 is, for example, a substrate made of metal that excels in heat dissipation capability, such as aluminum and copper. The substrate 293, which is thermally coupled to the phosphor layer 291, functions as a heat dissipater that dissipates the heat of the phosphor layer 291 to cool the phosphor layer 291.

In the present embodiment, the first light focusing optical system 27 cooperates with the first homogenizer optical system 23 to homogenize the illuminance distribution of the first light K1 incident on the phosphor layer 291. The first light focusing optical system 27 further cooperates with the second homogenizer optical system 24 to homogenize the illuminance distribution of the light ray bundle K2p1 incident on the phosphor layer 291.

Figure 3:
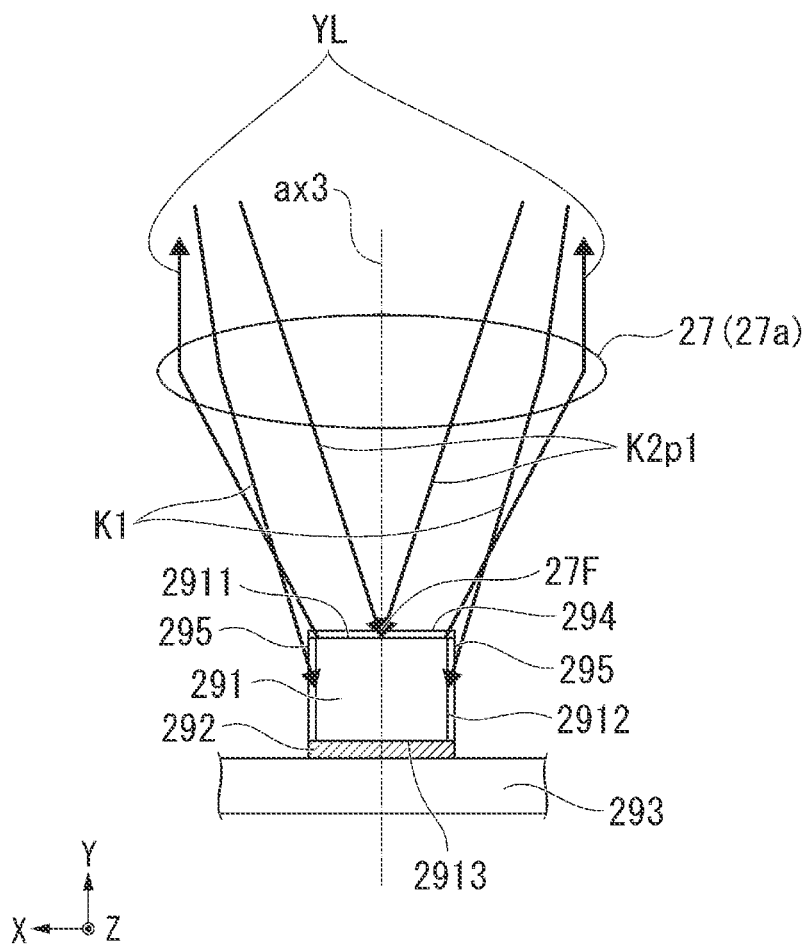
FIG. 3 is an enlarged cross-sectional view of key parts of a wavelength converter.

FIG. 3 is an enlarged cross-sectional view of key parts of the wavelength converter 29. FIG. 3 also shows part of the first light focusing optical system 27 for convenience of the description.

The first light focusing optical system 27 focuses the light ray bundle K2p1 on the front surface 2911 of the phosphor layer 291, as shown in FIG. 3. That is, the light ray bundle K2p1 is incident in a focused state of being brought into focus on the front surface 2911 of the phosphor layer 291. The light ray bundle K2p1 focused by the first light focusing optical system 27 enters the phosphor layer 291 via the front surface 2911 thereof.

On the other hand, the concave lens 38 causes the first light K1 to diverge, as described above. The first light focusing optical system 27 therefore focuses the first light K1 at the rear surface 2913, which is shifted inward from the front surface 2911 of the phosphor layer 291. That is, the first light K1 is incident in a defocused state of being not brought into focus on the front surface 2911 of the phosphor layer 291. The first light K1 focused by the first light focusing optical system 27 enters the phosphor layer 291 via the front surface 2911 and the side surfaces 2912 thereof.

The wavelength converter 29 includes an antireflection film 294 provided at the front surface 2911 of the phosphor layer 291 and dichroic films 295 provided at the side surfaces 2912 of the phosphor layer 291. The antireflection film 294 is formed, for example, of an AR coating. The dichroic films 295 are characterized by transmitting the first light K1 and the light ray bundle K2p1 having the blue wavelength band and reflecting the fluorescence YL.

In the wavelength converter 29 in the present embodiment, the first light K1 and the light ray bundle K2p1 as the excitation light efficiently enter the phosphor layer 291 via the front surface 2911 thereof with the aid of the antireflection film 294 provided at the front surface 2911. Furthermore, the wavelength converter 29, which includes the dichroic films 295 provided at the side surfaces 2912, allows the first light K1 as the excitation light to efficiently enter the phosphor layer 291 via the side surfaces 2912 thereof. Moreover, the wavelength converter 29 in the present embodiment can efficiently emit the fluorescence YL via the front surface 2911 because the dichroic films 295 and the reflection member 292 reflect the fluorescence YL back into the phosphor layer 291.

The thus configured light source apparatus 2 according to the present embodiment allows the first light K1, which is the primary component of the excitation light that excites the phosphor layer 291, to enter the phosphor layer 291 via the front surface 2911 and the side surfaces 2912 thereof. Since the light ray bundle K2p1, which is part of the second light K2, is an auxiliary component of the excitation light, the amount of light ray bundle K2p1 is sufficiently smaller than the amount of first light K1, so that the radiation of the light ray bundle K2p1 does not increase the optical density at the front surface 2911 of the phosphor layer 291.

The phosphor layer 291 can absorb the first light K1 and the light ray bundle K2p1 as the excitation light to generate and emit the yellow fluorescence YL.

The fluorescence YL emitted from the phosphor layer 291 is parallelized by the first light focusing optical system 27. The parallelized fluorescence YL passes through the first polarization separator 25, as shown in FIG. 2. The fluorescence YL having passed through the first polarization separator 25 enters the first phase retarder 32. Since the fluorescence YL is unpolarized, the polarization state thereof does not change when passing through the first phase retarder 32. The fluorescence YL having passed through the first phase retarder 32 is incident on the second polarization separator 26. The fluorescence YL passes through the second polarization separator 26 and travels toward the optical integration system 35. The second polarization separator 26 combines the fluorescence YL with the diffused blue light BL to generate the white illumination light WL and outputs the illumination light WL toward the optical integration system 35.

The white illumination light WL enters the optical integration system 35. The optical integration system 35 is formed, for example, of a first lens array 35a and a second lens array 35b. The first lens array 35a includes a plurality of first lenslets 35am, and the second lens array 35b includes a plurality of second lenslets 35bm.

The first lens array 35a separates the illumination light WL into a plurality of thin light ray bundles. The first lenslets 35am each bring the thin light ray bundle into focus at the corresponding second lenslet 35bm. The optical integration system 35, in cooperation with the superimposing lens 37 which will be described later, homogenizes the illuminance distribution in image formation areas of the light modulators 4R, 4G, and 4B shown in FIG. 1, which are illumination receiving areas.

The illumination light WL having passed through the optical integration system 35 enters the polarization converter 36. The polarization converter 36 is formed, for example, of polarization separation films and retardation films (half-wave plates). The polarization converter 36 converts the polarization directions of the illumination light WL into the polarization direction of one of the polarization components.

The illumination light WL having passed through the polarization converter 36 enters the superimposing lens 37. The illumination light WL having exited out of the superimposing lens 37 enters the color separation system 3. The superimposing lens 37 superimposes the plurality of thin light ray bundles described above, which form the illumination light WL, on one another at the illumination receiving areas (image formation areas) of the light modulators 4R, 4G, and 4B so that the areas are uniformly illuminated.

Effects of Present Embodiment

The light source apparatus 2 according to the present embodiment includes the first light source section 21, which outputs the first light K1 having the blue wavelength band, the second light source section 22, which outputs the second light K2 having the blue wavelength band, the first polarization separator 25, on which the first light K1 outputted from the first light source section 21 is incident and which reflects the first light K1, the second polarization separator 26, on which the second light K2 outputted from the second light source section 22 is incident and which reflects the light ray bundle K2s formed of the S polarization component and transmits the light ray bundle K2p formed of the P polarization component, the first phase retarder 32, which is disposed between the first polarization separator 25 and the second polarization separator 26 and on which the light ray bundle K2s reflected off the second polarization separator 26 is incident, the phosphor layer 291, which converts the first light K1 incident via the first polarization separator 25 and the light ray bundle K2p1 incident via the first phase retarder 32 and the first polarization separator 25 into the fluorescence YL having the yellow wavelength band and outputs the fluorescence YL toward the first polarization separator 25, the first light focusing optical system 27, which is disposed between the phosphor layer 291 and the first polarization separator 25, and the concave lens 38, which is disposed between the first light source section 21 and the first polarization separator 25 and which the first light K1 outputted from the first light source section 21 enters. The phosphor layer 291 has the front surface 2911, which faces the first polarization separator 25, and the side surfaces 2912. The first light K1, which is outputted from the first light source section 21 and travels via the concave lens 38, is focused by the first light focusing optical system 27 and enters the phosphor layer 291 at least via the side surfaces 2912 thereof, and the second ray bundle K2p1, which is part of the second light K2 outputted from the second light source section 22, is focused by the first light focusing optical system 27 and enters the phosphor layer 291 via the front surface 2911 thereof.

The light source apparatus 2 according to the present embodiment, which includes the concave lens 38 in the optical path of the first light K1 to be incident on the first polarization separator 25, allows the first light K1, which is the primary component of the excitation light, to enter the reflective phosphor layer 291 via the front surface 2911 and the side surfaces 2912 thereof. The second light K2, which is the auxiliary component of the excitation light, can enter the phosphor layer 291 via the front surface 2911 thereof. The optical density of the excitation light at the front surface 2911 of the phosphor layer 291 can thus be reduced as compared with a case where the first light K1, which is the primary component of the excitation light, is incident only on the front surface 2911.

The light source apparatus 2 according to the present embodiment can thus reduce a decrease in the conversion efficiency due to an increase in the temperature of the phosphor layer 291 by reducing the optical density at the front surface 2911 of the phosphor layer 291. The phosphor layer 291 can therefore generate bright fluorescence YL.

In the light source apparatus 2 according to the present embodiment, the concave lens 38 is not disposed in the optical path of the fluorescence YL and therefore does not affect the travel path of the fluorescence YL parallelized by the first light focusing optical system 27. The light source apparatus 2 according to of the present embodiment therefore allows the fluorescence YL, which is formed of a parallelized light bundle, to efficiently enter the downstream optical integration system 35, whereby the efficiency at which the fluorescence YL is utilized can be improved.

In the light source apparatus 2 according to the present embodiment, the front surface 2911 of the phosphor layer 291 is disposed at the focal point 27F of the first light focusing optical system 27.

According to the configuration described above, the fluorescence YL emitted via the front surface 2911 of the phosphor layer 291 can be satisfactorily picked up and parallelized by the first light focusing optical system 27.

The light source apparatus 2 according to the present embodiment includes the diffuser 30, on which the light ray bundle K2p formed of the P polarization component and having passed through the second polarization separator 26 is incident, and the second light focusing optical system 28, which is disposed between the second polarization separator 26 and the diffuser 30, and the diffuser 30 is disposed at the focal point 28F of the second light focusing optical system 28.

According to the configuration described above, the diffused blue light BL outputted from the diffuser 30 can be satisfactorily picked up and parallelized by the second light focusing optical system 28.

The light source apparatus 2 according to the present embodiment includes the second phase retarder 33, which is provided between the second polarization separator 26 and the second light focusing optical system 28, and the light ray bundle K2p enters, as light having the P polarization component, the second phase retarder 33, passes through the second phase retarder 33, is outputted by the diffuser 30, and passes through the second phase retarder 33 again so as to be converted into the diffused blue light BL formed of the S polarization component.

According to the configuration described above, the diffused blue light BL formed of the S polarization component can be generated and used as the illumination light WL.

The light source apparatus 2 according to the present embodiment includes the reflection member 292, which is provided at the rear surface 2913 of the phosphor layer 291, which is the surface opposite from the front surface 2911 thereof, and the substrate 293, which is thermally coupled to the phosphor layer 291 via the reflection member 292.

According to the configuration described above, the fluorescence YL having propagated in the phosphor layer 291 to the rear surface 2913 is reflected off the rear surface 2913 and allowed to exit via the front surface 2911. Furthermore, since the substrate 293 can efficiently dissipate the heat of the phosphor layer 291, the temperature of the phosphor layer 291 is lowered, whereby the efficiency of the conversion performed by the phosphor layer 291 can be improved.

The light source apparatus 2 according to the present embodiment includes the third phase retarder 34 provided in the optical path of the second light K2 between the second light source section 22 and the second polarization separator 26, and the third phase retarder 34 is configured to be rotatable.

According to the configuration described above, appropriately setting the angle of rotation of the third phase retarder 34 allows adjustment of two component of the second light K2, the component that enters the wavelength converter 29 and the component that travels toward the diffuser 30. The adjustment of the ratio between the fluorescence YL and the diffused blue light BL contained in the illumination light WL allows adjustment of the white balance of the illumination light WL.

The light source apparatus 2 according to the present embodiment includes the dichroic films 295 provided at the side surfaces 2912 of the phosphor layer 291, and the dichroic films 295 transmit the first light K1 and the light ray bundle K2p1 both having the blue wavelength band and reflect the fluorescence YL.

According to the configuration described above, the wavelength converter 29, which includes the dichroic films 295 provided at the side surfaces 2912, allows the first light K1 to efficiently enter the phosphor layer 291 via the side surfaces 2912 thereof. Furthermore, the wavelength converter 29 can efficiently emit the fluorescence YL via the front surface 2911 because the dichroic films 295 reflect the fluorescence YL back into the phosphor layer 291. That is, the first light focusing optical system 27 can efficiently pick up the fluorescence YL. The amount of fluorescence YL that cannot be picked up by the first light focusing optical system 27 can be reduced. The efficiency at which the fluorescence YL is utilized can therefore be improved.

In the light source apparatus 2 according to the present embodiment, the first light K1 enters the phosphor layer 291 and is focused on a position shifted inward from the front surface 2911 of the phosphor layer 291.

According to the configuration described above, the first light K1 is allowed to enter the phosphor layer 291 in a defocused state in which the first light K1 is not brought into focus at the front surface 2911 of the phosphor layer 291. The configuration in which the first light K1 enters the phosphor layer 291 via the front surface 2911 and the side surfaces 2912 can thus be achieved.

The projector 1 according to the present embodiment includes the light source apparatus 2, the light modulators 4R, 4G, and 4B, which modulate the light from the light source apparatus 2 in accordance with image information, and the projection optical apparatus 6, which projects the light modulated by the light modulators 4R, 4G, and 4B.

The projector 1 according to the present embodiment, which includes the light source apparatus 2 described above, can be a projector that excels in display quality.

The present disclosure has been described above with reference to an embodiment by way of example but is not necessarily limited to the embodiment described above, and a variety of changes can be made thereto to the extent that the changes do not depart from the substance of the present disclosure.

Variations

Figure 4:
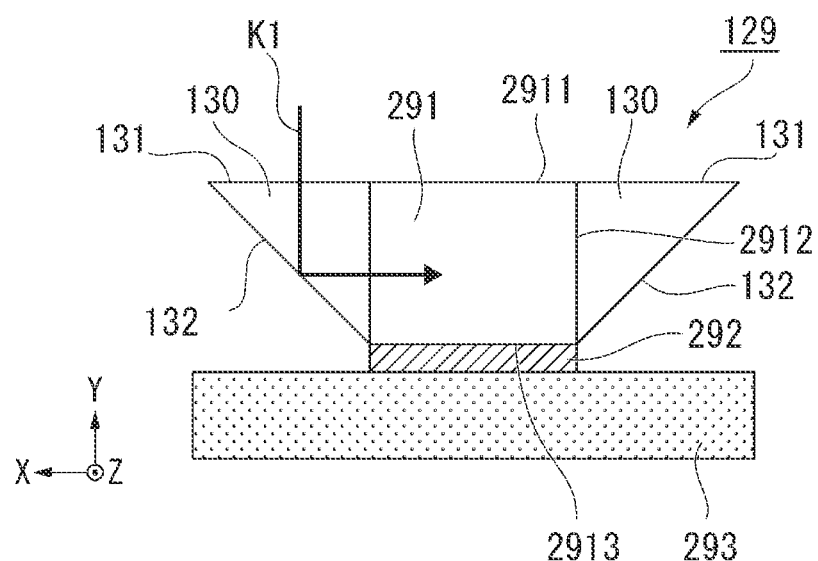
FIG. 4 is a cross-sectional view of the wavelength converter according to a variation.
Figure 5:
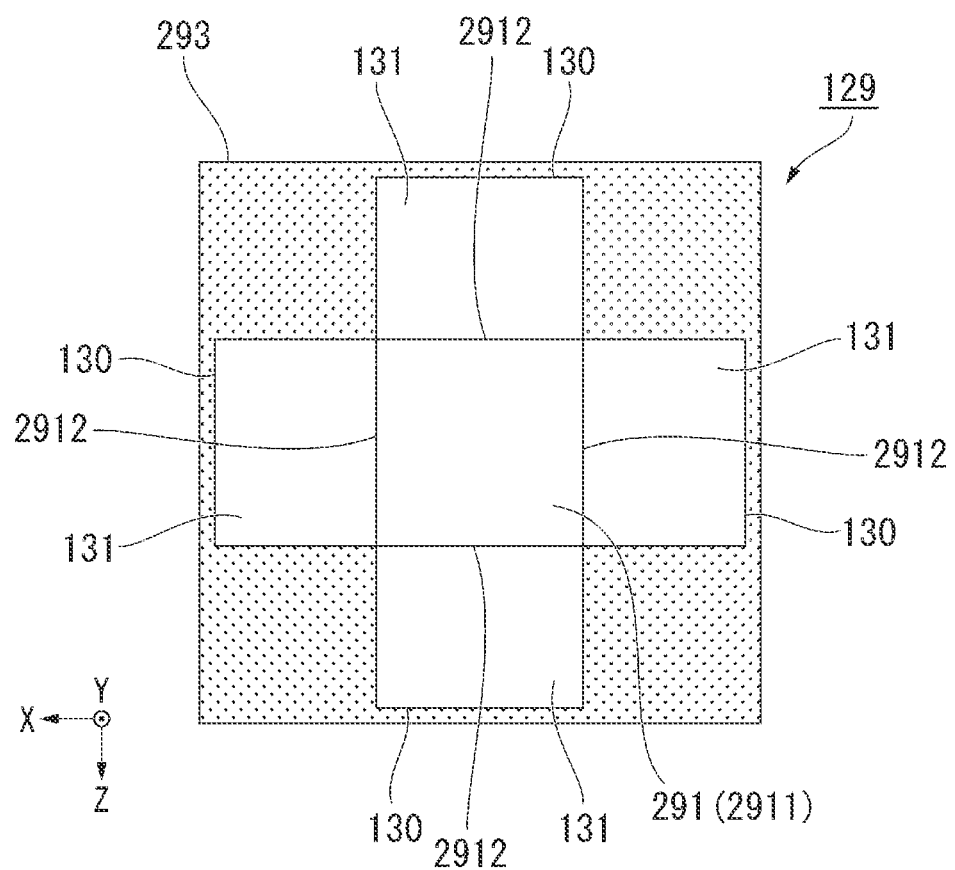
FIG. 5 is a plan view of the wavelength converter according to the variation.

FIGS. 4 and 5 show the configuration according to a variation of the wavelength converter. FIG. 4 is a cross-sectional view of the wavelength converter according to the variation, and FIG. 5 is a plan view of the wavelength converter according to the variation. The antireflection film 294 and the dichroic films 295 are omitted in FIGS. 4 and 5.

A wavelength converter 129 according to the present variation includes light transmissive members 130 provided at the side surfaces 2912 of the phosphor layer 291, as shown in FIGS. 4 and 5.

The light transmissive members 130 are provided at the four side surfaces 2912 of the phosphor layer 291. The light transmissive members 130 are each formed of a triangular prism. In the present variation, the material of the light transmissive members 130 is sapphire, which excels in thermal conductivity and heat resistance.

The light transmissive members 130 each have a light incident surface 131, which is flush with the front surface 2911 of the phosphor layer 291, and an inclining surface 132, which obliquely intersects with the light incident surface 131. The light transmissive members 130 each can also capture stray light components of the first light K1 that travel outside the side surfaces 2912 of the phosphor layer 291 via the light incident surface 131 and cause the capture stray light to be totally reflected off the inclining surface 132 and enter the phosphor layer 291 via the side surface 2912. The wavelength converter 129 according to the present variation, which includes the light transmissive members 130, can therefore efficiently capture the first light K1 into the phosphor layer 291. Sapphire, which excels in light transmission, can reduce loss of the first light K1 due to passage through the light transmissive members 130. The efficiency at which the first light K1 is utilized can therefore be improved.

In the present variation, since the light transmissive members 130 made of sapphire, which excels in heat dissipation capability, are provided at the side surfaces 2912 of the phosphor layer 291, the light transmissive members 130 can function as a heat dissipating member for the phosphor layer 291. That is, the dissipation of the heat of the phosphor layer 291 via the transmissive members 130 along with the substrate 293 allows large improvement in the heat dissipation capability of the phosphor layer 291. The improvement in the conversion efficiency of the phosphor layer 291 therefore allows generation of bright fluorescence YL.

In the embodiment described above, the projector 1 including the three light modulators 4R, 4G, and 4B has been presented by way of example, and the present disclosure is also applicable to a projector that displays color video images via one light modulator. Furthermore, the light modulators are not limited to the liquid crystal panels described above and can instead, for example, be digital mirror devices.

The light source apparatus according to the embodiment of the present disclosure is used in a projector by way of example, but not necessarily. The light source apparatus according to the present disclosure may be used as a lighting apparatus, such as a headlight of an automobile.

A light source apparatus according to an aspect of the present disclosure may have the configurations below.

A light source apparatus according to an aspect of the present disclosure includes a first light source section that outputs first light having a first wavelength band, a second light source section that outputs second light having the first wavelength band, a first polarization separator on which the first light outputted from the first light source section is incident and which reflects the first light, a second polarization separator on which the second light outputted from the second light source section is incident and which reflects part of the second light and transmits the other part of the second light, a first phase retarder which is disposed between the first polarization separator and the second polarization separator and on which the part of the second light reflected off the second polarization separator is incident, a wavelength conversion layer that converts the first light and the part of the second light into third light having a second wavelength band different from the first wavelength band and outputs the third light toward the first polarization separator, a first light focusing optical system disposed between the wavelength conversion layer and the first polarization separator, and a concave lens which is disposed between the first light source section and the first polarization separator and on which the first light outputted from the first light source section is incident. The wavelength conversion layer has a first surface which faces the first polarization separator and via which the third light exits and a second surface that intersects with the first surface. The first light is focused by the first light focusing optical system and enters the wavelength conversion layer at least via the second surface thereof, and the part of the second light is focused by the first light focusing optical system and enters the wavelength conversion layer via the first surface thereof.

In the light source apparatus according to the aspect of the present disclosure, the first surface of the wavelength conversion layer may be disposed at the focal point of the first light focusing optical system.

The light source apparatus according to the aspect of the present disclosure may include a dichroic film provided at the second surface of the wavelength conversion layer, and the dichroic film may transmit light having the first wavelength band and reflect light having the second wavelength band.

In the light source apparatus according to the aspect of the present disclosure, the first light may enter the wavelength conversion layer and may be focused on a position shifted inward from the first surface of the wavelength conversion layer.

The light source apparatus according to the aspect of the present disclosure may include a light transmissive member provided at the second surface of the wavelength conversion layer.

In the light source apparatus according to the aspect of the present disclosure, the light transmissive member may be made of sapphire.

A projector according to another aspect of the present disclosure may have the configuration below.

A projector according to the other aspect of the present disclosure includes the light source apparatus according to the aspect of the present disclosure, a light modulator that modulates the light from the light source apparatus in accordance with image information, and a projection optical apparatus that projects the light modulated by the light modulator.

What is claimed is:
1. A light source apparatus comprising:
  a first light source that emits first light having a first wavelength band;
  a second light source that emits second light having the first wavelength band;
  a first polarization separator on which the first light emitted from the first light source is incident and which reflects the first light;
  a second polarization separator on which the second light emitted from the second light source is incident and which reflects part of the second light and transmits another part of the second light;

a first phase retarder which is disposed between the first polarization separator and the second polarization separator and on which the part of the second light reflected off the second polarization separator is incident;

a wavelength conversion layer that converts the first light and the part of the second light into third light having a second wavelength band different from the first wavelength band and outputs the third light toward the first polarization separator;

a first light focusing optical system disposed between the wavelength conversion layer and the first polarization separator; and a concave lens which is disposed between the first light source and the first polarization separator and on which the first light emitted from the first light source is incident, wherein the wavelength conversion layer has a first surface which faces the first polarization separator and via which the third light exits and a second surface that intersects with the first surface, the first light diverged by the concave lens is focused by the first light focusing optical system and enters the wavelength conversion layer at least via the second surface thereof, and the part of the second light is focused by the first light focusing optical system and enters the wavelength conversion layer via the first surface thereof.

2. The light source apparatus according to claim 1, wherein the first surface of the wavelength conversion layer is disposed at a focal point of the first light focusing optical system.

3. The light source apparatus according to claim 1, further comprising a dichroic film provided at the second surface of the wavelength conversion layer, wherein the dichroic film transmits light having the first wavelength band and reflects light having the second wavelength band.

4. The light source apparatus according to claim 1, wherein the first light enters the wavelength conversion layer and is focused on a position shifted inward from the first surface of the wavelength conversion layer.

5. The light source apparatus according to claim 1, further comprising a light transmissive member provided at the second surface of the wavelength conversion layer.

6. The light source apparatus according to claim 5, wherein the light transmissive member is made of sapphire.

7. A projector comprising:
the light source light source apparatus according to claim 1;
a light modulator that modulates light from the light source apparatus in accordance with image information; and
a projection optical apparatus that projects the light modulated by the light modulator.

8. The light source apparatus according to claim 1, wherein the wavelength conversion layer is a rod-shaped phosphor having the first surface and the second surface, and
the first light diverged by the concave lens enters the phosphor at least via the second surface thereof.

9. The light source apparatus according to claim 4, wherein the first light is incident in a focused state of being brought into focus on the first surface of the wavelength conversion layer, and
the second light is incident in a defocused state of being brought into focus on the first surface of the wavelength conversion layer.

* * * * *